United States Patent [19]

Hashimoto et al.

[11] Patent Number: 4,675,242

[45] Date of Patent: Jun. 23, 1987

[54] METHOD FOR HOLDING HARD PLATE UNDER SUCTION AND SOFT SHEET SUITABLE FOR USE IN THE PRACTICE OF THE METHOD

[75] Inventors: Takeji Hashimoto; Kenji Watanabe, both of Kyoto, Japan

[73] Assignee: Dainippon Screen Mfg. Co., Ltd., Kamikyo, Japan

[21] Appl. No.: 792,528

[22] Filed: Oct. 29, 1985

[30] Foreign Application Priority Data

Dec. 27, 1984 [JP] Japan ................................ 59-273767

[51] Int. Cl.[4] .......................... B32B 3/10; B32B 3/26; B25B 11/00

[52] U.S. Cl. ................................. 428/131; 428/304.4; 269/21

[58] Field of Search ................ 269/21; 428/131, 304.4

[56] References Cited

U.S. PATENT DOCUMENTS

| | | | |
|---|---|---|---|
| 3,598,006 | 8/1971 | Gerber et al. | 83/14 |
| 3,617,045 | 11/1971 | DaCosta et al. | 269/21 |
| 3,765,289 | 10/1973 | Gerber et al. | 83/452 |
| 4,049,484 | 9/1977 | Priest et al. | 156/285 |
| 4,138,080 | 2/1979 | Albert | 248/206 R |
| 4,211,808 | 7/1980 | Trankle | 428/131 |
| 4,301,999 | 11/1981 | Higgins et al. | 269/21 |
| 4,543,862 | 10/1985 | Levene et al. | 83/19 |

*Primary Examiner*—John L. Goodrow
*Assistant Examiner*—Patrick J. Ryan
*Attorney, Agent, or Firm*—Thomas A. Turner, Jr.

[57] ABSTRACT

A hard plate such as blank paper board can be held under suction on a table, such as the table of a coordinate plotter, with air holes bored therethrough, by superposing a soft sheet, which includes an air-permeable portion at a desired location and an air-impermeable portion made of an air-impermeable elastic material and surrounding the periphery of the air-permeable portion, over the table in such a way that the air-permeable portion is communicated with the air holes; superposing the hard plate on the soft sheet in such a way that at least the air-permeable portion is covered by the hard plate; and sucking air through the air holes to hold the hard plate by vacuum. Use of the soft sheet permits easy, prompt and sure positioning of the hard plate even if a warp or distortion is contained in the hard plate.

5 Claims, 3 Drawing Figures

METHOD FOR HOLDING HARD PLATE UNDER SUCTION AND SOFT SHEET SUITABLE FOR USE IN THE PRACTICE OF THE METHOD

This invention relates to a method for holding, under suction, a hard plate, for example, a wooden form on a table in a coordinate plotter or the like and to a soft sheet suitable for direct use in the practice of the method.

As a method for mass-producing cartons such as packaging cartons, it has conventionally been practiced to prepare a male mold by planting cutting means, which has a configuration conforming with the profile of the development of intended cartons, on a wooden form, to prepare a matching female mold, to place each blank paper board on the female mold, and then to pressing the male mold against the female mold so as to cut the blank paper board into the profile of the intended development.

In order to cut a groove in a wooden form for planting such cutting means therein, some methods have been adopted including the use of laser beam or electric saw. When an electric saw is used, it is necessary as a first step to draw the development of an intended carton on the surface of a wooden form.

Conventionally, a sheet of paper with the development of the carton drawn thereon was adhered on the surface of the wooden form and a groove was then cut out along the development by an electric saw or the like. Such a conventional method is however accompanied by inconvenience that the paper may, for example, be peeled off, torn or set off during the cutting work. It is also accompanied by a drawback that the positioning of the development relative to the wooden form is cumbersome and is very inefficient.

The present invention has been completed with a view toward permitting direct drawing of a development with high accuracy on a desired area of the surface of a wooden form by means of a coordinate plotter.

A sheet-like material such as paper sheet or film may be easily held under suction on the table of a coordinate plotter by merely placing the sheet-like material over a number of air holes bored in the upper surface of the table and then sucking air through the air holes to develop vacuum in the air holes. The above suction-holding method is however accompanied by a problem that it is not applicable successfully where the sheet-like material is a hard plate such as wooden or metallic plate, to say nothing of a hard plate bearing a warp or slight deformation.

As a conventional method for holding hard plates such as wooden or metallic plates in place, positioning means, screws and the like are employed to fasten them. However, this conventional method involves a problem that the fastening work is irksome.

An object of this invention is to provide a method for holding such a hard plate under suction, easily, promptly and precisely, on a table of a coordinate plotter or the like without need for such positioning means or screws as well as a soft sheet suitable for direct use in the practice of the above method.

In one aspect of this invention, there is thus provided a method for holding a hard plate under suction, which comprises:

superposing a soft sheet, which includes an air-permeable portion at a desired location and an air-impermeable portion made of an air-impermeable elastic material and surrounding the periphery of the air-permeable portion, over a table with air holes bored therethrough in such a way that the air-permeable portion is communicated with the air holes;

superposing the hard plate on the soft sheet in such a way that at least the air-permeable portion is covered by the hard plate; and sucking air through the air holes to hold the hard plate by vacuum.

In another aspect of this invention, there is also provided a soft sheet suitable for use in holding a hard plate under suction, which comprises an air-permeable portion defining an opening and an air-impermeable portion made of an air-impermeable elastic material and surrounding the periphery of the air-permeable portion.

According to the method of this invention, the air-impermeable portion of the soft sheet is interposed as a packing between the upper surface of the table and the hard plate and holds hermetically the area surrounding the periphery of the air-permeable portion when air is sucked through the air holes of the table to produce vacuum in the air holes. The interiors of the air holes are thus depressurized, whereby the hard plate is promptly and surely held under suction on the upper surface of the table.

When the soft sheet of this invention is used upon practice of the above-described method, the hard plate can be promptly and surely held in place owing to the provision of the air-permeable portion upon sucking the hard plate on the table by vacuum. Where the air-permeable portion is formed as a mere void, a warp may be developed in the hard plate at an area which corresponds to the air-permeable portion. The provision of a porous elastic material in the void can however avoid such a problem and makes it possible to hold the hard plate under suction evenly in accordance with the configurations of the upper surface of the table while maintaining the planar configurations of the hard plate.

The above and other objects, features and advantages of the present invention will become apparent from the following description and the appended claims, taken in conjunction with the ccompanying drawings, in which:

Figure 1:
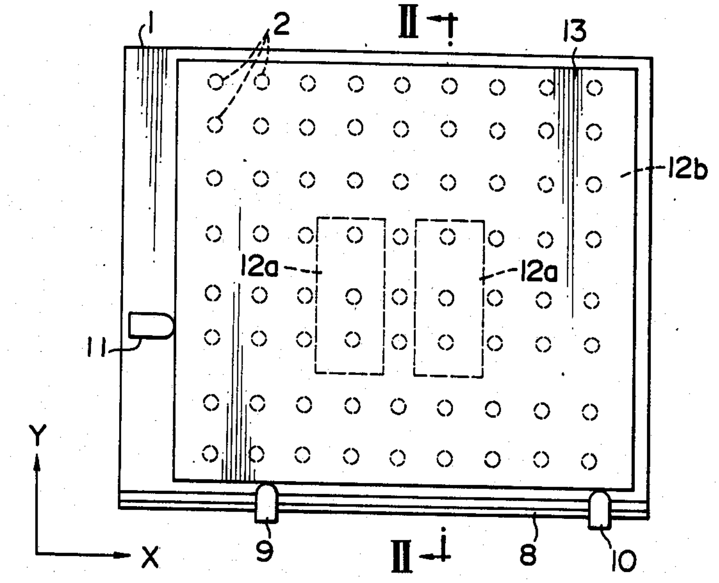
FIG. 1 is a plan view of an exemplary apparatus, showing the manner of practice of the method of this invention.
Figure 2:
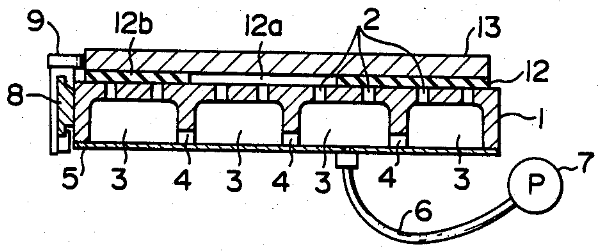
FIG. 2 is a vertical cross-sectional side view of the apparatus, taken along line II-II of FIG. 1.

One embodiment of this invention will hereinafter be described on the basis of the accompanying drawings. First of all, the exemplary apparatus useful in the practice of this invention will be described with reference to FIG. 1 and FIG. 2.

Numeral 1 indicates a horizontal table in a coordinate plotter. In the upper surface, a number of air holes 2 are bored in a suitable pattern. By way of a plurality of cavities 3 formed in a lower part of the table 1 and communication channels 4 extending between the cavities 3, the lower ends of the air holes 2 are kept in communication with a flexible air tube 6 connected to a lower board 5 which closes up the lower surface of the table 1. By operating a vacuum pump 7 connected to the air tube 6, it is possible to suck air through the air holes 2 from an area above the table 1.

Although not shown in the drawings, there is provided, over the table 1, a carriage which is movable in the direction X relative to the frame (not shown) of the coordinate plotter. A drawing head (not shown) provided slidably on the carriage is caused to move in the direction Y which extends at a right angle relative to the direction Y, whereby a desired pattern can be automatically drawn on a hard plate 13 held under suction on the table 1.

Detailed description on the structure of such a coordinate plotter per se is omitted here, because it has no direct connection to the present invention.

A guide rail 8 which extends in the direction X is fixedly provided on one side edge of the table 1. 0n this guide rail 8, two contact positioners 9, 10 adapted to position the hard plate 13 in the direction Y are slidably mounted.

A stopper 11 is fixedly provided on the upper surface of the table at a suitable location in order to position the hard plate 13 in the direction X.

Designated at numeral 12 is a soft sheet which also pertains to the present invention. In the illustrated embodiment, two rectangular openings formed centrally are left as voids. Namely, the soft sheet 12 is in the form of a rectangular sheet in which the peripheries of air-permeable portions 12*a* are surrounded by an air-impermeable portion 12*b*, for example, made of an air-impermeable elastic material such as rubber, a soft synthetic material or the like.

Numeral 13 indicates a rectangular hard plate such as the above-mentioned wooden plate for a wooden form for the production of cartons, metallic plate or the like.

Description will next be made how the method of this invention is practiced using the above-described apparatus.

First of all, the positions of the contact positioners 9,10 are adjusted in accordance with the external dimensions of the hard plate 13 which is to be sucked. Thereafter, the soft sheet 1 is placed on the table 1 in such a way that some air holes 2 open in the air-permeable portions 12*a* and all the remaining air holes 2 are closed by the air-impermeable portion 12*b*.

The hard plate 13 is next superposed on the soft sheet 12. The left end edge and lower side edge of the hard plate 13 are thereafter brought into contact with the contact positioners 9,10 and the stopper 11 respectively, whereby the positioning of the hard plate 13 is effected relative to the table 1.

No problem will be developed even if a slight positional offset is present between the soft sheet 12 and hard plate 13 or their dimensions are slightly different.

Upon actuation of the vacuum pump 7, the air-impermeable portion 12*b* of the soft sheet 12 is sucked by its associated air holes 2 which are located underneath the air-impermeable portion 12*b*. Thus, the air-impermeable portion 12*b* is brought into close contact with the upper surface of the table 1. On the other hand, the air-permeable portions 12*a* are evacuated through their associated air holes 2 which are in communication with the air-permeable portions 12*a*, thereby produced reduced pressure in the air-permeable portions 12*a*.

Here, the air-impermeable portion 12*b* is interposed outside the air-permeable portions 12*a* between the hard plate 13 and table 1. The air-impermeable portion 12*b* serves as a packing so that the hard plate 13 and air-impermeable portion 12*b* and the air-impermeable portion 12*b* and table 1 are hermetically held together respectively. Accordingly, the area outside the peripheries of the air-permeable portions 12*a* are kept air-tight and the hard plate 13 is gradually sucked toward the upper surface of the table 1 as the internal pressure of the air-permeable portions 12*a* drops.

As the hard plate 13 is sucked toward the upper surface of the table 1, the air-impermeable portion 12*b* of the soft sheet 12 is compressed. The hermetic contact between the hard plate 13 and the upper surface of the table 1 is ensured further as the air-impermeable portion 12*b* is compressed further.

Even if the hard plate 13 contains a warp or distortion, it can be readily held under suction on the table 1 without failure provided that after actuation of the vacuum pump 7, the hard plate 13 is lightly pressed against the upper surface of the table 1.

Thereafter, the drawing head is moved in both directions X,Y to draw a pattern such as the development of a carton on the upper surface of the hard plate 13 held under suction on the table 1.

After completion of the drawing, the operation of the vacuum pump 7 is stopped and the vacuum of the air tube 6 is released to the atmosphere by suitable means. It is now ready to remove the hard table 13 easily from the table 1.

Figure 3:
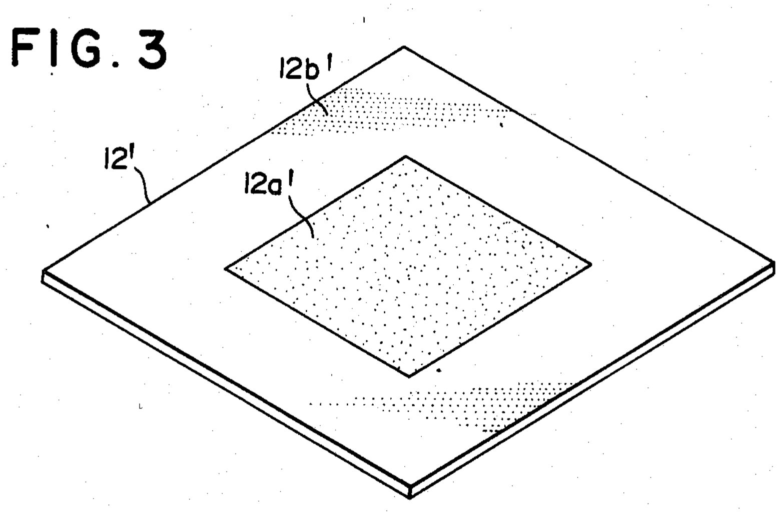
FIG. 3 is a perspective view of another example of the soft sheet which is useful in the practice of this invention.

FIG. 3 illustrates another embodiment of the soft sheet useful in the practice of the method of this invention.

The soft sheet 12' is equipped, in its central opening, with an air-permeable portion 12*a'* made of an air-permeable porous elastic material such as sponge or sponge-like soft and foamed synthetic resin. The periphery of the air-permeable portion 12*a'* is surrounded by an air-impermeable portion 12*b'* made of an air-impermeable elastic material similar to the air-impermeable portion 12 in the above-described soft sheet 12.

Substitution of the soft sheet 12' for the soft sheet 12 in the above-described embodiment of the method of this invention can avoid the danger that when the air-permeable portion 12*a* is left as a void, the hard plate 13 develops a warp at a location corresponding to the void, because the elastic material of the air-permeable portion 12*a'* is also compressed similar to the elastic material of the air-impermeable portion 12*b'* while the hard plate 13 is held under suction on the table 1. Use of the soft sheet 12' can thus bring about a merit that the hard table 13 can be evenly held under suction in good conformity with the configurations of the upper surface of the table 1 while maintaining the planar configurations of the hard plate 13 in a better state.

In the soft sheet 12', it is preferred to make the coefficient of elasticity of the air-permeable portion 12*a'* and that of the air-impermeable portion 12*b'* as close as possible.

As apparent from the above description, the present invention makes it possible to hold promptly and surely under suction hard materials, which have conventionally had to be held in place by fastening holding means with screws or the like, on a table in the same manner as sheet-like materials such as paper sheets, films and the like. The present invention has valuable significance.

It is convenient to practice the above-described method by using the soft sheet of this invention, because hard plates can be surely held under suction while maintaining their planar configurations.

Having now fully described the invention, it will be apparent to one of ordinary skill in the art that many changes and modifications can be made thereto without departing from the spirit or scope of the invention as set forth herein.

We claim:

1. A method for holding a hard plate under suction, which comprises:

superposing a soft sheet, which includes an air-permeable portion at a desired location and an air-impermeable portion made of an air-impermeable elastic material and surrounding the periphery of the air-permeable portion, over a table with air holes bored therethrough in such a way that the air-permeable portion is communicated with the air holes;

superposing the hard plate on the soft sheet in such a way that at least the air-permeable portion is covered by the hard plate; and sucking air through the air holes to hold the hard plate by vacuum.

2. A method according to claim 1, wherein the air-permeable portion of the soft sheet is a void.

3. A method according to claim 1, wherein the air-permeable portion of the soft sheet is formed of an air-permeable porous elastic material.

4. A soft sheet suitable for use in holding a hard plate under suction, comprising an air-permeable portion defining an opening and an air-impermeable portion made of an air-impermeable elastic material and surrounding the periphery of the air-permeable portion.

5. A soft sheet according to claim 4, wherein an air-permeable porous elastic material is filled in the opening.

* * * * *